US008966898B2

(12) United States Patent
Corley

(10) Patent No.: US 8,966,898 B2
(45) Date of Patent: *Mar. 3, 2015

(54) ENERGY RETRIEVER SYSTEM

(71) Applicant: Harlequin Motor Works, Inc., Wilmington, DE (US)

(72) Inventor: Paul W. Corley, Fort Lauderdale, FL (US)

(73) Assignee: Harlequin Motor Works, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,773

(22) Filed: Aug. 14, 2013

(65) Prior Publication Data

US 2013/0327034 A1   Dec. 12, 2013

Related U.S. Application Data

(63) Continuation of application No. 12/977,040, filed on Dec. 22, 2010, now Pat. No. 8,534,067, which is a continuation of application No. 11/935,397, filed on Nov. 5, 2007, now Pat. No. 7,997,077.

(60) Provisional application No. 60/857,048, filed on Nov. 6, 2006.

(51) Int. Cl.
*F01K 23/10* (2006.01)
*F01K 25/00* (2006.01)
(Continued)

(52) U.S. Cl.
CPC ............... *F02B 61/00* (2013.01); *F01K 23/065* (2013.01); *F01K 25/08* (2013.01); *Y02T 10/16* (2013.01)
USPC ................ 60/618; 60/517; 60/671; 62/238.3; 62/238.7

(58) Field of Classification Search
CPC ....... F01K 23/065; F01K 25/08; F02B 61/00; Y02T 10/16
USPC ........ 60/618, 670–671, 677, 650–651, 641.2, 60/641.8, 516–517, 320–323; 180/165, 180/65.245, 65.21, 65.51, 36–38, 246, 200, 180/297, 65.2, 65.27, 65.275; 903/602, 903/903, 906, 907; 701/22; 62/238.1; 123/25 B
See application file for complete search history.

(56) References Cited

U.S. PATENT DOCUMENTS

| 1,456,322 | A |   | 5/1923 | McNeill |
| 2,715,894 | A | * | 8/1955 | Shirrell ..................... 123/25 B |

(Continued)

FOREIGN PATENT DOCUMENTS

| DE | 3814791 A1 | 11/1989 |
| DE | 4302473 A1 | 8/1994 |

(Continued)

*Primary Examiner* — Thai Ba Trieu
(74) *Attorney, Agent, or Firm* — Charles D. Gunter, Jr.

(57) ABSTRACT

Disclosed is an energy retriever system and methods for absorbing energy and using that energy elsewhere or converting it to other useful forms of energy or work. The energy retriever system consists of a series of components interconnected by a plurality of conduits containing a fluid. Working as a self-contained thermodynamic system, the energy retriever system allows the fluid to circulate through all of these elements. Heat added to the energy capture subsystem heats the fluid. The fluid becomes more pressurized and moves into the expansion cycle subsystem. The energy extraction subsystem transforms the thermal energy of the fluid into work, kinetic energy or thermal energy. The reservoir subsystem compresses the fluid and reintroduces it into the energy capture subsystem. One-way valves are used throughout the system to keep the flow of the fluid in one direction and separate sections of the system that contain different pressures.

4 Claims, 7 Drawing Sheets

(51) Int. Cl.
*F01B 29/10* (2006.01)
*F02G 1/04* (2006.01)
*F25B 27/00* (2006.01)
*F02B 61/00* (2006.01)
*F01K 23/06* (2006.01)
*F01K 25/08* (2006.01)

(56) References Cited

U.S. PATENT DOCUMENTS

| | | | | |
|---|---|---|---|---|
| 3,608,311 | A * | 9/1971 | Roesel, Jr. | 60/516 |
| 4,235,077 | A * | 11/1980 | Bryant | 60/618 |
| 4,241,588 | A * | 12/1980 | Murphy et al. | 62/238.1 |
| 4,394,582 | A * | 7/1983 | Kreissl et al. | 60/618 |
| 4,428,190 | A | 1/1984 | Bronicki | |
| 4,445,485 | A * | 5/1984 | Chamness, Jr. | 123/546 |
| 4,458,493 | A | 7/1984 | Amir et al. | |
| 4,831,817 | A | 5/1989 | Linhardt | |
| 4,996,845 | A * | 3/1991 | Kim | 60/618 |
| 5,272,879 | A * | 12/1993 | Wiggs | 60/641.2 |
| 5,327,987 | A * | 7/1994 | Abdelmalek | 180/65.25 |
| 6,170,587 | B1 * | 1/2001 | Bullock | 180/65.27 |
| 6,206,630 | B1 | 3/2001 | Feltenberger et al. | |
| 6,213,233 | B1 * | 4/2001 | Sonntag et al. | 180/65.245 |
| 6,301,890 | B1 | 10/2001 | Zeretzke | |
| 6,393,840 | B1 * | 5/2002 | Hay | 60/618 |
| 6,450,283 | B1 * | 9/2002 | Taggett | 60/618 |
| 6,651,433 | B1 * | 11/2003 | George, Jr. | 60/618 |
| 6,701,708 | B2 * | 3/2004 | Gross et al. | 60/517 |
| 6,751,959 | B1 | 6/2004 | McClanahan et al. | |
| 6,817,185 | B2 | 11/2004 | Coney et al. | |
| 6,918,254 | B2 | 7/2005 | Baker | |
| 7,007,487 | B2 | 3/2006 | Belokon et al. | |
| 7,287,612 | B2 * | 10/2007 | Tarasinski et al. | 180/65.7 |
| 7,739,005 | B1 * | 6/2010 | Tang | 701/22 |
| 7,966,829 | B2 * | 6/2011 | Finkenrath et al. | 60/772 |
| 7,997,077 | B2 * | 8/2011 | Corley | 60/618 |
| 8,091,663 | B2 * | 1/2012 | Ichikawa | 180/65.275 |
| 8,534,067 | B2 * | 9/2013 | Corley | 60/618 |
| 2003/0213245 | A1 | 11/2003 | Yates et al. | |
| 2003/0213248 | A1 | 11/2003 | Osborne et al. | |
| 2007/0187159 | A1 * | 8/2007 | Lee et al. | 180/65.2 |
| 2008/0163625 | A1 | 7/2008 | O'Brien | |
| 2008/0289313 | A1 | 11/2008 | Batscha et al. | |
| 2009/0151356 | A1 | 6/2009 | Ast et al. | |
| 2009/0211253 | A1 | 8/2009 | Radcliff et al. | |
| 2009/0228150 | A1 | 9/2009 | Alston | |
| 2009/0277705 | A1 * | 11/2009 | Ichikawa | 180/65.275 |
| 2009/0288695 | A1 | 11/2009 | Jaisinghaul | |
| 2009/0320477 | A1 | 12/2009 | Juchymenko | |
| 2010/0018207 | A1 | 1/2010 | Juchymenko | |
| 2012/0204557 | A1 * | 8/2012 | Jebasinski et al. | 60/321 |
| 2013/0283784 | A1 * | 10/2013 | Uzkan et al. | 60/618 |

FOREIGN PATENT DOCUMENTS

| | | | | |
|---|---|---|---|---|
| DE | 102012102351 | A1 * | 3/2012 | F02G 5/02 |
| EP | 2180171 | A1 * | 4/2010 | F02G 5/02 |
| JP | 7197813 | A | 8/1995 | |
| JP | 2000320786 | A | 11/2000 | |
| JP | 2008185001 | A * | 8/2008 | F01K 23/10 |
| KR | 2008024790 | A * | 3/2008 | B01D 53/00 |
| KR | 2012104027 | A * | 9/2012 | B60W 20/00 |
| WO | 2006138459 | A2 | 12/2006 | |

* cited by examiner

ENERGY RETRIEVER SYSTEM

CROSS-REFERENCE TO RELATED APPLICATION(S)

The present application is a continuation of U.S. Ser. No. 12/977,040, filed Dec. 22, 2010, entitled "Energy Retriever System," by the same inventor, which was, in turn, a continuation of U.S. Ser. No. 11/935,397, filed on Nov. 5, 2007, now issued U.S. Pat. No. 7,997,077, which claimed the benefit of a provisional U.S. Patent Application No. 60/857,048, filed on Nov. 6, 2006, with the same title and by the same inventor.

BACKGROUND OF THE INVENTION

1. Field of the Invention

The present invention relates to absorbing energy into a thermodynamic system and using that energy elsewhere or converting it to other useful forms of energy. These energy forms can be used to perform work, reduce the normal workload within a system and in some embodiments it can be used to perform both 2. Description of the Prior Art Many of the machines used today are powered by internal combustion engines (ICE). As part of their normal operation, heat is created. This heat is typically viewed as a waste product and many times, additional work needs to be performed by the ICE to get rid of this heat. Currently, there are few devices that retrieve this energy and use it to create work or reduce the work normally performed by the ICE.

Using the example of an automobile, there are many devices in an automobile that are powered by mechanisms that force the ICE to do more work. By adding more work that must be performed by the ICE, more fuel is used. A good example of this is an automobile alternator that uses the mechanical energy of the ICE to produce an electric charge to charge a battery. Another example is the ICE cooling system that forces work on the engine to circulate coolant through the engine. Similar examples exist in other uses of ICEs. A refrigeration truck or fishing boat uses significant amounts of fuel to create the mechanical energy that runs the compressor to keep their refrigeration compartments cool. At the same time, the ICE discharges a significant amount of heat as waste.

By reducing the mechanical work demands on an ICE and substituting that work with work performed by other energy sources, the ICE can work less and burn less fuel. Energy sources that are already present in an ICE, such as waste heat, can provide a substitute or supplement for that work. In addition, these energy sources can supplement the mechanical work the ICE performs to move a body further reducing the fuel consumption.

A similar situation exists with building environmental control systems. A building's exterior is exposed to thermal energy coming from the sun. The heat creates a larger demand on the environmental control systems when the temperature is high by demanding more air conditioning. There are few ways to take advantage of this heat source and convert it to useful work that can lower the electrical demand caused by the increased need in air conditioning.

By using a heat source that is normally a waste by-product as the energy source, this system can create work that was otherwise not available. If sufficient energy is captured, multiple types of work can be extracted from the system. For systems such as an automobile, this additional work can make the total automobile more efficient.

The existing art is attempts to work within the existing designs, and therefore the existing temperature and pressure ranges of engine designs. These approaches miss the benefits that can come from other solutions that utilize extreme temperatures and pressures. By increasing the amount of heat that is taken from the ICE, it may be possible to have the ICE operate at higher temperatures. And by operating an ICE at these higher temperatures, the efficiency of the ICE can be increased.

Additionally, existing solutions comprise point solutions that do not necessarily maximize the efficiency of multiple waste energy sources and multiple energy extraction means.

In the existing art, U.S. Pat. No. 4,996,845 discloses a power generating device however this device is limited to automobile implementations and requires constant operation of the automobile engine to generate power.

U.S. Pat. No. 6,751,959 discloses a power cycle with fluids having low boiling points however, that implementation does not disclose features to make the power cycle efficient in environments such as mobile vehicles.

The prior art does not address the benefits and challenges associated with solutions integrating multiple devices and systems connected to a power generating device connected to what is normally a waste heat source.

There remains a useful benefit, therefore, for an energy retriever system that can capture energy and transport or convert that energy into other useful sources. By capturing energy that is typically a nuisance or a waste product, the efficiency of systems can be increased.

SUMMARY OF THE INVENTION

The energy retriever system consists of a self-contained series of components interconnected by a plurality of conduits containing a fluid. The components include an energy capture subsystem, an expansion cycle subsystem a condenser cycle subsystem and a reservoir subsystem. One-way pressure/vacuum (PV) valves are used throughout the energy retriever system and subsystems to keep the flow of the fluid in one direction. These one-way PV valves are positioned to separate sections of the system that contain different pressures. Working together as a self-contained system, the energy retriever system allows the fluid to circulate through all of these elements. Heat added to the energy capture subsystem heats the fluid. The fluid becomes more pressurized and moves into the expansion cycle subsystem. The expansion cycle subsystem transforms the thermal energy of the fluid into kinetic energy as well as thermal energy. The reservoir subsystem compresses the fluid and allows it to be reintroduced into the energy capture subsystem.

It is an object of one embodiment of this invention to provide an energy retriever system comprising: an energy capture subsystem having a heat source at an operational temperature and a conduit containing a fluid at a pressure; an expansion cycle subsystem; a condenser cycle subsystem; a reservoir subsystem; a plurality of conduits connecting the energy capture subsystem, the condenser cycle subsystem and the reservoir subsystem; and the plurality of conduits containing the fluid having a high expansion factor, high thermal conductivity and a boiling point lower than the operational temperature of the heat source and lower than the pressure of the fluid at the heat source.

It is another object of one embodiment of the invention to provide an energy retriever system wherein the expansion cycle subsystem comprises a turbo.

It is another object of the invention to provide an energy retriever system wherein the expansion cycle system further comprises an electric generator interoperably connected to the turbo.

It is a further object of one embodiment of the invention to provide an energy retriever system wherein the energy retriever system interoperates with a self propelled mobile vehicle.

It is another object of one embodiment of the invention to provide an energy retriever system wherein: the expansion cycle subsystem comprises at least one conduit, a valve, a turbo and an electric generator interoperably connected to the turbo; the condenser cycle subsystem comprises at least one conduit, at least one radiant cooler; and the reservoir subsystem comprises at least one conduit, at least one valve, a reservoir, a compressor and a pump.

It is a further object of one embodiment of the invention to provide an energy retriever system wherein the energy retriever system interoperates with a self propelled mobile vehicle.

It is another object of one embodiment of the invention to provide an energy retriever system wherein the heat source comprises an internal combustion engine and the generator is interoperably connected to an electric motor that assists in propelling the mobile vehicle.

It is an object of one embodiment of the invention to provide an energy retriever system wherein the generator is interoperably connected to a battery charger that charges at least one battery.

It is another object of one embodiment of the invention to provide an energy retriever system wherein the at least one battery is interoperably connected to an electric motor that assists in propelling the mobile vehicle.

It is a further object of one embodiment of the invention to provide an energy retriever system wherein the at least one battery assists in propelling the mobile vehicle while the heat source is not generating heat.

It is a further object of one embodiment of the invention to provide an energy retriever system wherein the heat source comprises at least one solar panel and the electric generator is interoperably connected to a battery charger that charges at least one battery.

It is a further object of one embodiment of the invention to provide an energy retriever system of wherein the condenser cycle subsystem further comprises a cooling system comprising a coiled conduit and a blowing means to cycle air over the coiled conduit whereby the fluid absorbs thermal energy from the cycled air and reduces the temperature of the cycled air.

It is a further object of one embodiment of the invention to provide an energy retriever system wherein the heat source comprises an internal combustion engine and the cooling system cools a compartment of the mobile vehicle.

It is a further object of one embodiment of the invention to provide an energy retriever system wherein the heat source comprises an internal combustion engine and the cooling system cools an air intake of the internal combustion engine.

It is a further object of one embodiment of the invention to provide an energy retriever system wherein the heat source comprises an internal combustion engine and the condenser cycle subsystem further comprises a coiled conduit and a blowing means to cycle air over the coiled conduit and thermally transfer heat from the coiled conduit whereby the cycled air heats the fuel of the internal combustion engine.

It is a further object of one embodiment of the invention to provide an energy retriever system wherein the cooling system cools a compartment of the mobile vehicle while the heat source is not generating heat.

It is a further object of one embodiment of the invention to provide an energy retriever system wherein the heat source comprises at least one solar panel and the cooling system cools a compartment of a habitable structure.

It is an object of one embodiment of the invention to provide an energy retriever system comprising: an energy capture subsystem comprising at least one conduit containing a fluid at a pressure and in thermal contact with an internal combustion engine exhaust having an operation temperature; an expansion cycle subsystem comprising at least one conduit, a valve, a turbo; the turbo being interoperably connected to an electric generator interoperably connected to at least one electric device whereby the generator can power the electric generator and the electric device by the turning of the turbo; the turbo being interoperably connected to an alternator that is interoperably connected to a battery interoperably connected to the electric device whereby the battery can be charged by the turbo and the battery can power the electric device; at least one solar panel interoperably connected to the battery whereby the battery can be charged by the solar panel; a condenser cycle subsystem comprising at least one conduit and at least one radiant cooler; the radiant cooler being thermally exposed to air and located in proximity to a space whereby the space can be cooled by the air exposed to the radiant cooler; a reservoir subsystem comprising at least one conduit, at least one valve, a reservoir, a compressor and a pump; a plurality of conduits connecting the energy capture subsystem, the condenser cycle subsystem and the reservoir subsystem; the plurality of conduits containing the fluid having a high expansion factor, high thermal conductivity and a boiling point lower than the operational temperature of the internal combustion engine and lower than the pressure of the fluid at the internal combustion engine; and the energy retriever system being contained within an automobile.

It is a further object of one embodiment of the invention to provide an energy retriever system wherein the fluid comprises helium.

It is a further object of one embodiment of the invention to provide an energy retriever system wherein the fluid comprises air.

It is an object of one embodiment of the invention to provide an method of retrieving energy from a fluid in an energy retriever system, the method comprising the steps of: transferring heat energy to a fluid utilizing an energy capture subsystem comprising at least one conduit in thermal contact with a heat source; extracting energy from the fluid in an expansion cycle subsystem comprising at least one conduit, a valve, a turbo and an electric generator interoperably connected to the turbo whereby a shaft connected to the turbo rotates and turns an interoperably connected generator; charging at least one battery with the generator; operating at least on electrical device with the at least one battery; condensing the fluid in a condenser cycle subsystem comprising at least one conduit, at least one radiant cooler whereby air flowing over the radiant cooler cools a space; recycling the fluid to the energy capture subsystem through a reservoir subsystem comprising at least one conduit, at least one valve, a reservoir, a compressor and a pump; and controlling the fluid with logic executed by a processor and memory interoperably connected to the at least one valve and the conduit.

It is an object of one embodiment of the invention to provide an energy retriever system wherein the fluid, if exposed to humans, is not hazardous to their health.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

DETAILED DESCRIPTION OF THE INVENTION

Figure 1:
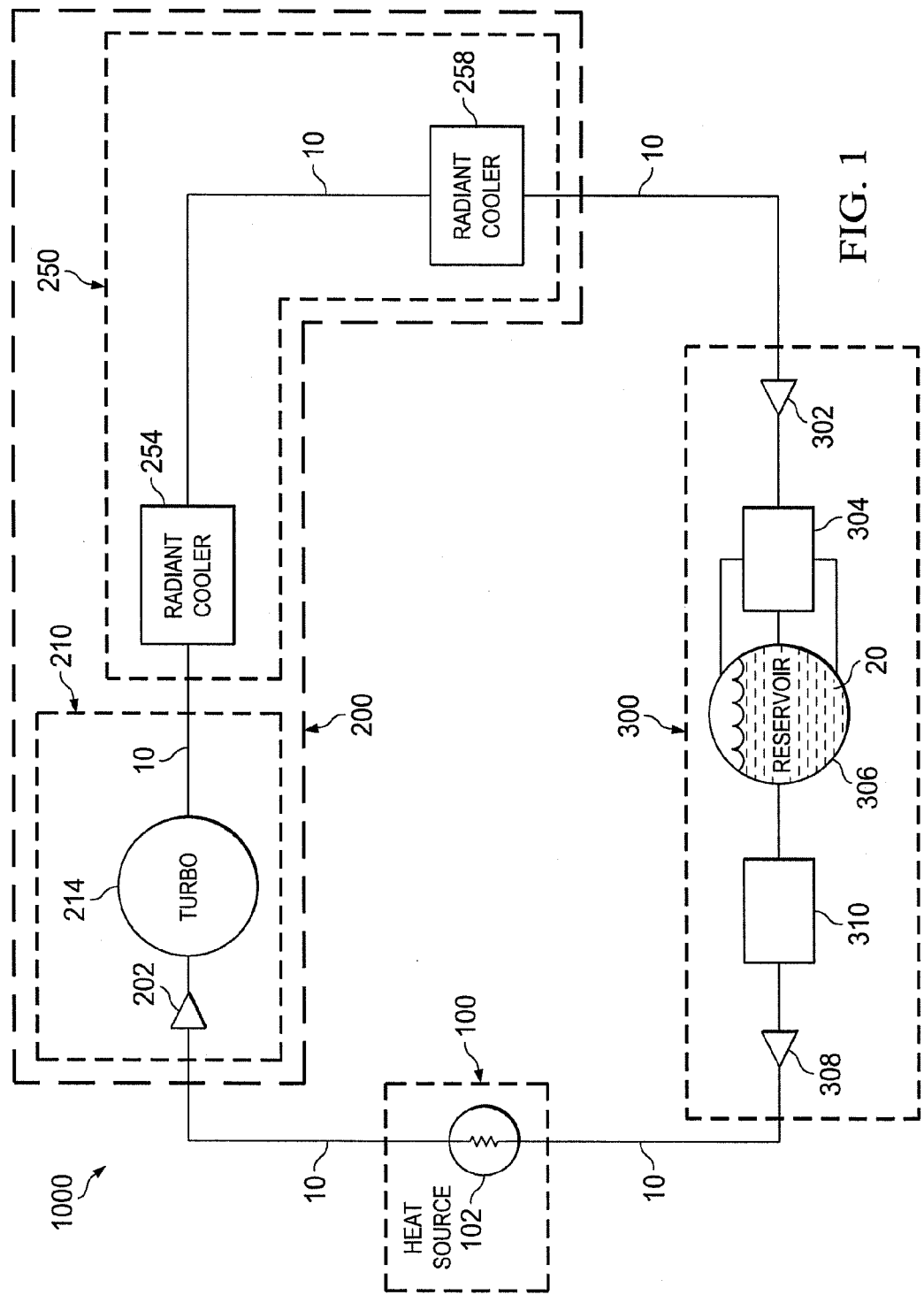
FIG. 1 shows one embodiment of the energy retriever system.

Before explaining the one disclosed embodiment of the present invention in detail it is to be understood that the invention is not limited in its application to the details of the particular arrangement shown since the invention is capable of other embodiments. Also, the terminology used in this detailed description is for the purpose of description and not of limitation.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The energy retriever system consists of a self-contained series of components interconnected by a plurality of conduits containing a fluid. The components include an energy capture subsystem, an expansion cycle subsystem a condenser cycle subsystem and a reservoir subsystem. One-way pressure/vacuum (PV) valves are used throughout the energy retriever system and subsystems to keep the flow of the fluid in one direction. These one-way PV valves are positioned to separate sections of the system that contain different pressures. Working together as a self-contained system, the energy retriever system allows the fluid to circulate through all of these elements. Heat added to the energy capture subsystem heats the fluid. The fluid becomes more pressurized and moves into the expansion cycle subsystem. The expansion cycle subsystem transforms the thermal energy of the fluid into kinetic energy as well as thermal energy. The reservoir subsystem compresses the fluid and allows it to be reintroduced into the energy capture subsystem.

Embodiments of this invention can be used with many different types of systems and energy sources. A building's exposure to the sun presents the opportunity to use that solar heat to generate other energy and work. One particular embodiment, use with an internal combustion engine (ICE), allows the heat energy created by the ICE to be converted to other forms of energy that can reduce the workload on the ICE. In a vehicle such as an automobile, embodiments of this invention will make the total automobile more efficient and reduce the fuel required to run the automobile. It is contemplated that embodiments of this invention can be applied to any ICE engine that produces heat during its operation regardless of the engine size or the type vehicle it is tasked with powering.

Composition of One Embodiment of the Energy Retriever System:

In one embodiment of the invention, the energy retriever system is used with an internal combustion engine (ICE) of a self propelled mobile vehicle such as an automobile. The heat of an ICE is not the only source of energy that can be used, but it illustrates the operation and benefits of the invention. Other embodiments of a heat source can include but are not limited to using heat from a building rooftop, heat from solar panels, heat from an ship engine or heat generated from any other heat source.

The Energy Retriever System Structure:

One embodiment of the energy retriever system comprises a self-contained series of components interconnected by a plurality of conduits 10 containing a fluid 20. As shown in FIG. 1, one embodiment of the energy retriever system 1000 comprises of a series of subsystems interconnected by a plurality of conduits 10 containing a fluid. The components include an energy capture subsystem 100, an expansion cycle subsystem 210 an condenser cycle subsystem 250, a reservoir subsystem 300 and a plurality of one way pressure/vacuum (PV) valves. The expansion cycle subsystem 210 and the condenser cycle subsystem 250 are collectively part of an energy extraction subsystem 200.

The components and subsystems of this energy retriever system are interconnected by the conduits containing the fluid 20. The conduits 10 comprise generally tubular material interconnected with the energy retriever system subsystems to carry the fluid between those subsystems. As used throughout this description, the conduit 10 may also comprise chambers or other compartments within components of the energy retriever system that allow the flow of fluid throughout the system. In addition to allow fluid flow in hot environments, the conduit must also be able to maintain high pressures within the conduit.

The fluid 20 used in this system, is defined as a material continuum that is unable to withstand a static shear stress and can comprise material that can be both a vapor and a liquid depending upon the temperature and pressure of the material. The fluid 20 used in this energy retriever system 1000 is selected from those fluids that have a high expansion factor, high thermal conductivity and a boiling point lower than the temperature of the heat source 102 and lower than the pressure the fluid 20 is subjected to at the heat source 102. An expansion factor is defined herein as a quantitative representation of a materials tendency to volumetrically expand rapidly at the slightest decrease in pressure or at the slightest increase in temperature. High thermal conductivity is defined herein as a representation of a materials tendency to freely exchange thermal energy. A boiling point is defined herein as the temperature and pressure at which a fluid changes state from a liquid to a vapor. The critical temperature as used herein is defined as the temperature above which a vapor cannot be liquefied. In one embodiment, the fluid comprises helium. Other suitable fluids include, but are not limited to water, ammonia, helium II, common refrigerants used in today's air conditioning units and other noble gases such as Neon, Argon, Krypton, Xenon, and Radon. Is it also contemplated that the fluid 20 could comprise air which can comprise a combination of the gases in the atmosphere including but not limited to a mixture of gases such as oxygen, carbon dioxide and nitrogen. Fluid selection should consider the chemical properties of the fluid and the operating environment of the energy retriever system 1000.

Within this energy retriever system 1000 is also a series of one-way PV valves to restrict the flow of the fluid in one direction. The one-way PV valves also perform the function of separating portions of the system so that different subsystems can maintain a different pressure on the fluid. The result of combining these subsystems is a self contained system that allows the fluid 20 to cycle through each of the subsystems while the fluid 20 holds different properties based on its pressure and temperature within those subsystems. Working together as a self-contained system, the energy retriever system 1000 allows the fluid 20 to circulate through all of its subsystems. Heat added to the energy capture subsystem 100 heats the fluid 20. The fluid 20 becomes pressurized and moves into the expansion cycle subsystem 210. The expansion cycle subsystem 210 transforms the thermal energy of the fluid 20 into kinetic energy as well as thermal energy. The condenser cycle subsystem 250 further transfers thermal energy. The reservoir subsystem 300 collects the fluid 20, puts the fluid 20 into a state to be received by the energy capture subsystem 100 and allows the fluid 20 to be reintroduced into the energy capture subsystem 100 where the cycle can continue.

It is understood that different embodiments of this energy retriever system 1000 can contain fluids 20 that will be in different states depending on the pressures and temperatures throughout the system. For example, if the fluid 20 comprises helium, it is not necessary, but it is likely that the fluid 20 can be maintained in a vapor state throughout the entire energy retriever system 1000. If the fluid 20 comprises helium in certain embodiments, it is also possible that the helium can be in a liquid or vapor state in the energy capture subsystem 100. As another example, if the fluid 20 comprises water, it is likely that while the system is in operation, the fluid 20 will primarily be in a liquid state in the energy capture subsystem 100, the reservoir subsystem 300 and the condenser cycle subsystem 250 while the fluid will primarily be in a vapor state, as steam, in expansion cycle subsystem 210.

Insulation placed throughout the system increases the efficiency of the system. For example, the more insulation provided between the heat source 102 and the radiant cooler 254 the more heat energy will be absorbed and held by the fluid 20 and the more effective fluid flow will be generated.

The above description is just one embodiment of the structural subsystems of the energy retriever system 1000. Other embodiments of the energy retriever system 1000 include, but are not limited to use with alternative heat sources such as but not limited to solar panels, solar cells, geothermal sources, incinerators and steam boilers. Other embodiments of the subsystems and components of the energy retriever system 1000 are described below.

The Energy Capture Subsystem Structure:

Referring to FIG. 1, the energy capture subsystem 100 is used to transfer thermal energy from the heat source 102 and transfer that energy into the energy retriever system 1000. The energy capture subsystem 100 comprises a section of conduit 10 in thermal contact with the heat source 102 so that heat can be transferred through the conduit 10 and to the fluid 20. A plurality of one-way PV valves interoperate with this energy capture subsystem 100 to hold the fluid 20 at pressure and release it into the expansion cycle subsystem 210 when the fluid pressure reaches a threshold. This threshold is calculated to ensure that sufficient flow of the fluid 20 from the energy capture subsystem 100 to drive the turbo 214 of the expansion cycle subsystem 210. To maintain pressure within the energy capture subsystem 100, one embodiment includes having at least two one-way PV valves on either end of this subsystem. As shown in FIG. 1, the energy capture subsystem 100 is able to use the PV valve 308 from the reservoir subsystem 300 to maintain pressure on the entry point of the fluid 20 into the energy capture subsystem 100. The PV valve 202 of the expansion cycle subsystem 210 is used to maintain the pressure on the exit point of the fluid 20 from the energy capture subsystem 100. The one-way PV valves are capable of being adjusted to allow the release of the pressurized fluid at specific pressure or temperature ranges. Adjustments can be made manually to the valves or the valves can be connected to a computer or similar device that can alter adjustments based on different system and environmental characteristics.

In one embodiment, the energy retriever system 1000 includes a control system, such as a computer with a processor, to retain in a memory thresholds and other constraints required for the system and this computer communicates with the system to perform the necessary adjustments.

Figure 6:
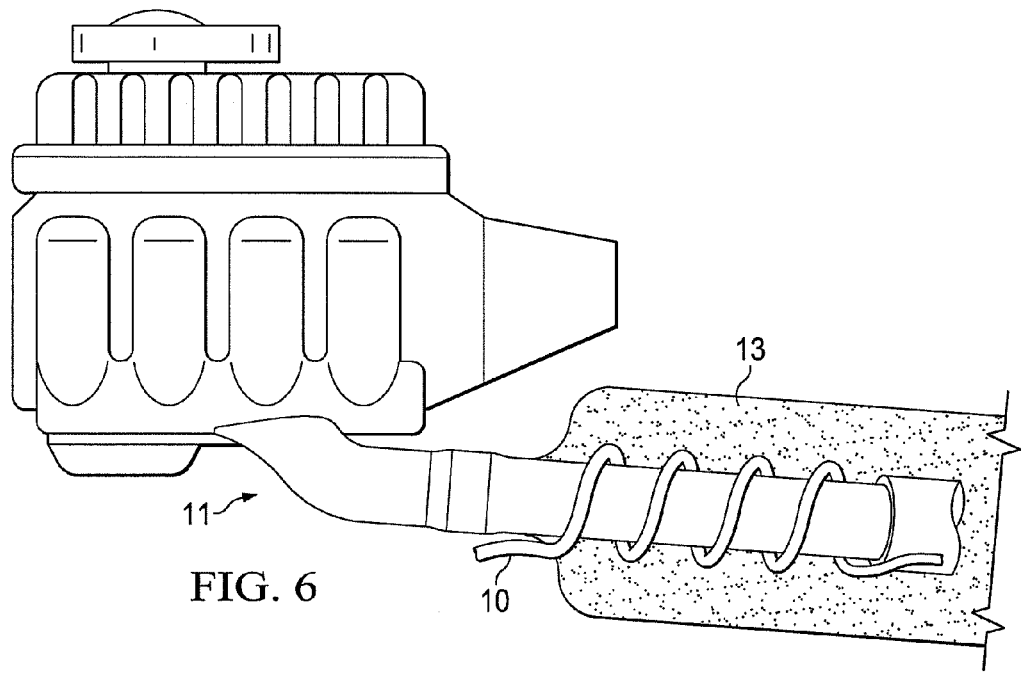
FIG. 6 shows an internal combustion engine having an exhaust system being wrapped and sealed with insulation.

For description purposes and not for limitation, the energy capture subsystem 100 takes the heat from an ICE after the combustion process and transfers that heat to the fluid 20. In this embodiment, the energy capture subsystem 100 comprises running the conduit 10 within the exhaust system of the ICE (see FIG. 6). The conduit 10 is used to guide the flow of the fluid 20 and can be wrapped around the exhaust manifold 11 and sealed with heavy insulation 13 to hold in the heat.

Although the exhaust headers are a good source of heat, other embodiments of a heat source 102 from an ICE include capturing ICE combustion heat by routing the conduits 10 directly through the engine block, routing them through the catalytic converter or routing them through the oil pan. These are some of the options and are not to be considered as a complete or limiting list of places from which heat can be captured from an ICE.

The material used to make the energy capture subsystem 100 and its components must be of a material that can withstand high temperatures and high pressure.

Other embodiments of this energy capture subsystem 100 include but are not limited to capturing thermal energy from solar panels and heat sources unrelated to an ICE.

The Energy Extraction Subsystem Structure:

The energy extraction subsystem 200 is comprised of the expansion cycle subsystem 210 and the condenser cycle subsystem 250. As shown in FIG. 1, one embodiment of the energy extraction subsystem 200 consists of a turbo 214 in the expansion cycle subsystem 210 and at least one radiant cooler 254 in the condenser cycle subsystem 250. It is not necessary to use both components nor is it necessary to limit the use to just these components.

The expansion cycle subsystem 210 allows a pressurized fluid 20, whether a vapor, a liquid or a supercritical fluid, to enter the expansion cycle subsystem and become rapidly decompressed. This flow of fluid 20 provides a kinetic energy source that can be used to produce further work. Interconnected with the energy capture subsystem 100, this expansion cycle subsystem receives high pressure fluid 20 from the energy capture subsystem 100 and brings it into a large area with a relatively lower pressure and a high velocity. This expansion cycle subsystem 210 can comprise of a one-way PV valve 202 and a turbo 214 powered by the kinetic energy of the fluid 20. The expansion cycle subsystem 210 can also comprise a larger volume container, such as a larger diameter conduit, that receives the lower temperature fluid 20 resulting from its rapid reduction in pressure after is passes from the one-way PV valve 202. The dimensions of the conduit 10 separating the turbo 214 from the valve 202 should be made such that the temperature drop between the valve 202 and the turbo 214 does not create a freezing condition that may interfere with the operation of the turbo 214.

In this embodiment, the expansion cycle subsystem 210 comprises a one-way PV valve 202, a conduit 10 opening onto a turbo 214 and exits into another section of conduit 10. The conduit 10 opening onto the turbo 214 is interconnected with the one-way PV valve 202 attached to the energy capture subsystem 100 so that the high velocity fluid 20 flows into the turbo 214. It is beneficial, although not required, to have the conduits 10 coming from the one-way PV valve 202 of a small diameter as they lead into the turbo 214. It is beneficial, although not required, to have the heat source 102 as close as possible to the turbo 214 to maximize the rate of fluid 20 flow through the turbo 214. The greater the pressure difference between the fluid's entry into and exit from the turbo 214, the faster the fluid flow will be.

Figure 7:
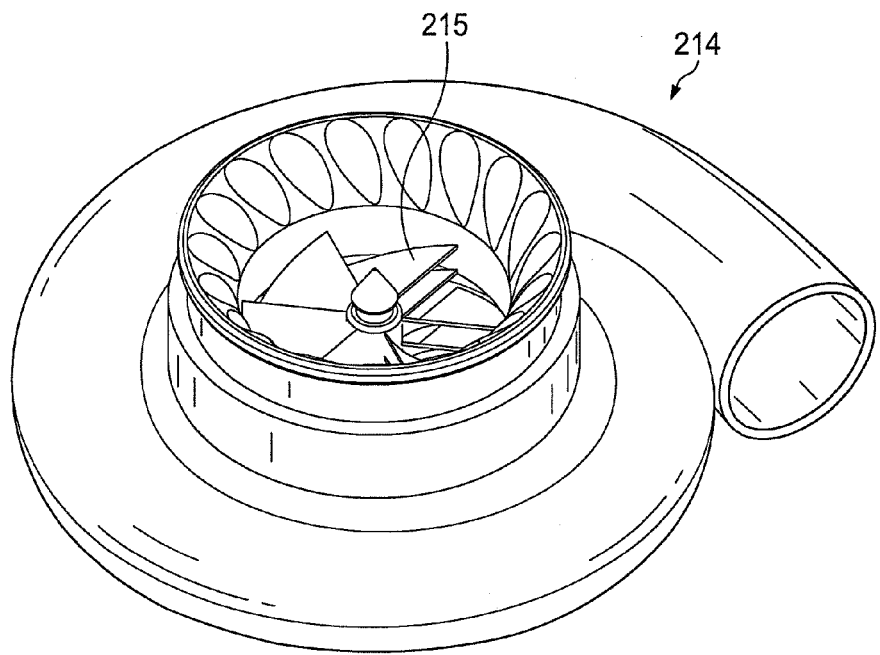
FIG. 7 shows a turbo having blades like a water wheel.

A turbo 214 as used throughout this description is defined as a mechanical device able to utilize the velocity flow of a pressurized fluid to produce mechanical output as torque through a rotating shaft 229. In one embodiment, the turbo 214 (see FIG. 7) comprises blades 215 much like a water wheel, a torque converter or a turbo charger connected to a rotatable shaft 229. Suitable turbo designs include, but are not limited to turbo's capable of operating at pressures between 166 to 4000 cubic feet per minute An example of a suitable turbo includes GT-K 1000 Turbonetics model sold by turbo-chargers.com of Houston, Tex. These existing turbo designs may need to be modified from simply compressing air to being designed to turn a shaft connected to generators, alternators and other power extraction devices. Modifications may also involve the use of some form of reduction gear between the turbo and the power extraction device. Other embodiments of a turbo include a turbine. The more heat the greater the expansion thus the larger the turbo 214 that can be used. And the larger the turbo 214 the greater the potential for extracting power from the turbo 214 and its shaft 229.

Embodiments of power extraction devices that utilize work from the turbo 214 and shaft are shown in FIGS. 2-5 and are described below.

In addition to the work that can be taken from the turbo 214, the decompression of the fluid 20 creates a reduction in the temperature of the fluid 20. This decompression can reduce the temperature of the fluid 20 through adiabatic flash, isentropic expansion or other thermodynamic processes depending on the properties of the fluid in this subsystem. In this embodiment, after the fluid 20 has passed through the expansion cycle subsystem 210, the decompressed fluid's temperature is reduced. This cold fluid 20 then flows into the condenser cycle subsystem 250.

The condenser cycle subsystem 250 thermal exposes the conduit 10 containing the cold fluid 20 coming from the expansion cycle subsystem 210 to the surrounding environment. In many applications, this environment will be air such as the normal atmosphere on earth. In one embodiment, this air is of a higher temperature than the fluid 20 in this subsystem and as a result, thermal exposure to the air heats the fluid 20. Interconnected to the expansion cycle subsystem 210, the condenser cycle subsystem 250 consists of the conduits exposed to this air. A radiant cooler 254, such as a radiator, or a coiling of the conduits 10 can be used to expose the conduits 10 to the air. More than one radiant cooler or radiator can be used in this subsystem. Having a blowing means, such as a fan or any other device that induces air flow blow over the condenser cycle subsystem 250 is not necessary, but it increases the amount of air exposed to the condenser cycle subsystem 250.

Although the term condenser is used as part of the description of this subsystem, it is understood that the fluid may not condense in particular embodiments of this invention.

The condenser cycle subsystem 250 can be comprised of a plurality of radiant coolers 254 as shown in FIG. 1.

In one embodiment, multiple radiant coolers are utilized and the air flow that comes from a first radiant cooler 254 is used as the air source to flow into the second radiant cooler 258.

The condenser cycle subsystem is 250 connected to the reservoir subsystem 300 through a conduit 10.

The Reservoir Subsystem:

Following the condenser cycle subsystem 250 is the reservoir subsystem 300. This subsystem preferably includes finned sections of the conduit 10 that are thermally exposed to the open flow of the outside air. This subsystem allows the fluid 20 to return to the state that is required for the energy capture subsystem 100. This reservoir subsystem 300 creates a vacuum to "pull" the fluid 20 in the direction desired and will increase the speed at which the fluid 20 flows. This will enhance the efficiency of the system.

The reservoir subsystem 300 pressurizes the fluid 20 and contains two one-way PV valves 302 and 308 on either end of this subsystem. The one-way PV valves constrict and control the flow of the fluid 20 so that the reservoir subsystem 300 can maintain a pressure. Interconnected by conduits 10, the reservoir subsystem 300 includes a reservoir 306 to collect and hold the fluid 20 whether it be in a liquid or vapor state. This reservoir 306 is pressurized by a compressor 304 to further induce the fluid 20 to its proper state and assist in the flowing of the fluid 20 into the energy capture subsystem 100. In operation, the reservoir 306 will need to be able to contain both liquid and vapor fluid 20 with space to allow for expansion and the flow of the fluid 20.

The conduits 10 that lead from the reservoir 306 to the heat source should be open to the flow of air to further assist in reducing the temperature in that part of the system.

Figure 2:
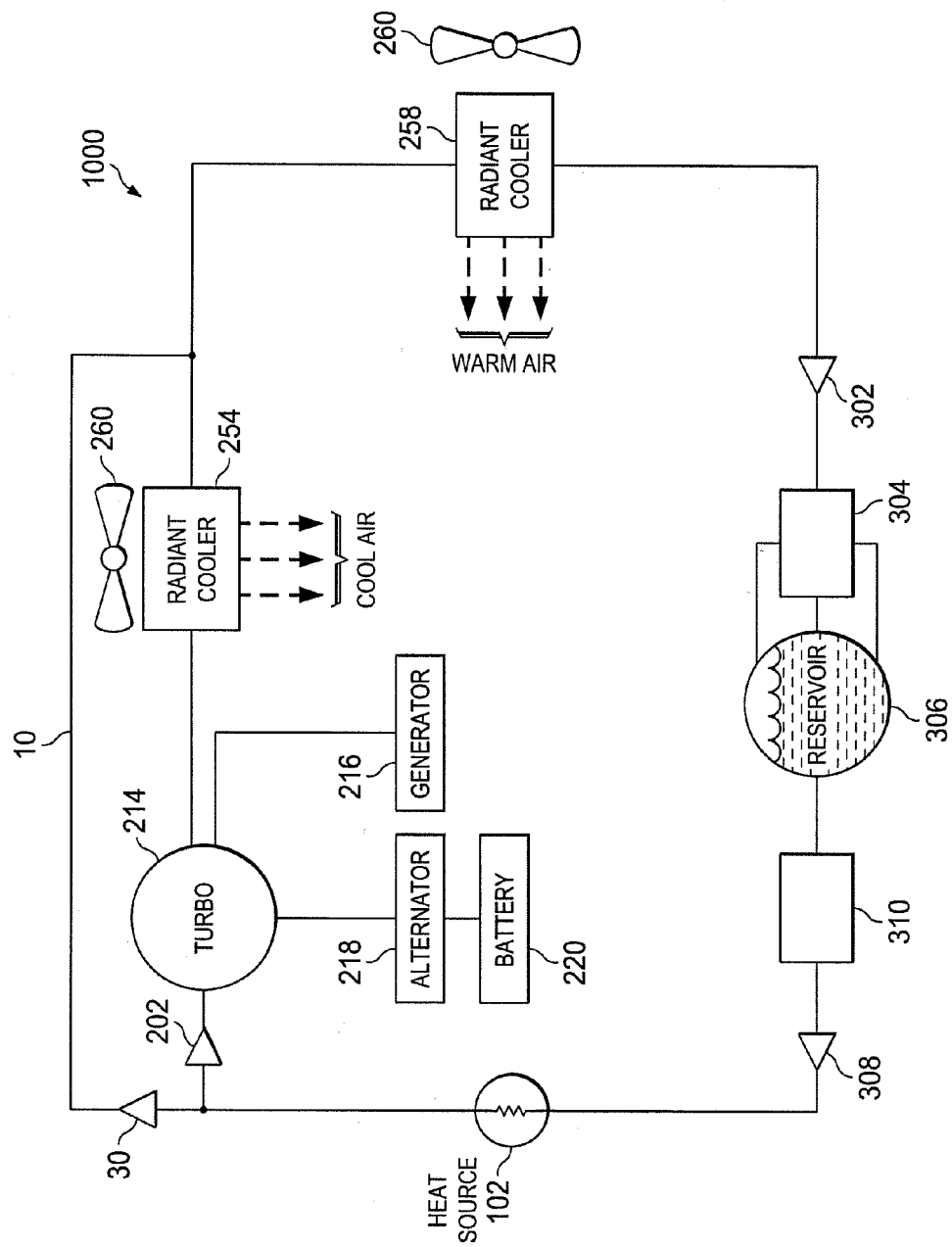
FIG. 2 shows another embodiment of the energy retriever system illustrating embodiments of the energy extraction subsystem.

Operation of the Energy Retriever System:

Operationally, the energy retriever system 1000 operates on the flow of fluid 20 caused by the energy capture subsystem 100. For illustration purposes, and not for limitation, a description of the embodiment of the energy retriever system 1000 as shown in FIG. 2 will be used to describe the system in operation. Where it will assist in illustrating this embodiment, the description will reflect an energy retriever system 1000 used with an automobile ICE as a heat source 102 and helium as a fluid 20.

When the energy retriever system is in it's "off" or cool state, the fluid 20 is disbursed within the conduits and components of the energy retriever system. The fluid 20 is in different states based on the location of the fluid 20 when the system was turned off. In the energy capture subsystem 100, the fluid 20 will be in equilibrium and either be in a vapor state or a liquid state depending on the ambient temperature and the pressure on the fluid 20 in the that subsystem. In this embodiment, it is contemplated that a fluid 20, such as helium, would be held at a temperature and a pressure in the energy capture subsystem 100 sufficient to maintain it as a saturated vapor or liquid when the energy retriever system 1000 is at an ambient temperature. In the expansion cycle subsystem 210, the fluid 20 helium is at a lower pressure than in the energy capture subsystem and will be in a vapor state at ambient temperature in the expansion cycle subsystem 210. In the condenser cycle subsystem 250, the fluid 20 helium is also in a vapor state at ambient temperature. In the reservoir subsystem 300, the fluid 20 helium is pressurized and will likely be in a mix of liquid and saturated vapor state.

When the ICE 102 starts, the ICE 102 warms up which in turns warms up the energy capture subsystem 100 and the contained helium fluid 20. As the temperature of the heat source 102 increases and the energy capture subsystem 100 transfers this heat to the fluid 20, the fluid 20 become hotter. Since the fluid 20 is past its boiling point, the added heat further pressurizes the fluid 20. Since the conduits 10 and one-way PV valves 202 and 308 constrain this fluid 20, the pressure on the fluid 20 increases until it passes a pressure threshold such that the fluid 20 starts to flow through the PV valve 202 and into the expansion cycle subsystem 210. The threshold for the fluid 20 is unique to its chemical properties and should be a value sufficient to ensure the released fluid can drive the turbo 214.

Until the heated fluid 20 passes through the PV valve 202, the rest of the fluid 20 in the energy retriever system 1000 remains cold relative to the heat source 102. As the heat source 102 and the fluid 20 warms, this reinforces a flow of the fluid 20 from the heat source 102 to the expansion cycle subsystem 210. The direction of flow is insured by the placement of one-way flow PV valves, such as 202, in selected points of the conduit 10.

As the fluid 20 in the energy capture subsystem 100 heats up and pressurizes, it passes the threshold of the one-way PV valve 202 and enters the expansion cycle subsystem 210. Since the pressure in the expansion cycle subsystem 210 is designed to be significantly lower than the pressure in the energy capture subsystem 100, the fluid 20 enters the expansion cycle subsystem 210 quickly, with significant velocity and causes a significant drop in fluid 20 temperature. The velocity and temperature drop will depend on the pressure of the fluid 20 entering the expansion cycle subsystem 210 and this will increase as the heat source 102 warms up and transfers more heat to the fluid 20. The pressure in the expansion cycle subsystem 210 is maintained by factoring the energy extraction from the overall energy extraction subsystem 200 and adjusting pressure within that system to extract the energy desired. It is possible to have valves, such as a one-way PV valve 30, to be used to be used as a by-pass and pass fluid 20 at a pressure that keeps the fluid in the expansion cycle and condenser cycle subsystems in a vapor state.

In this embodiment, as the fluid 20 passes through a PV valve 202, and enters the expansion cycle subsystem 210, it undergoes an abrupt reduction in pressure. The fluid 20 is also flowing at high velocity. This high velocity fluid 20, that must be in a vapor state, engages the blades of the turbo 214 and the turbo shaft turns. That pressure reduction in the expansion cycle subsystem 210 also results in the rapid reduction in temperature of the fluid 20. This reduction in temperature of the fluid 20 is dependant upon the particular fluid used and the properties of the energy retriever system 1000. Fluids 20 will be selected that properly work with the energy retriever system 1000 properties.

The turbo 214 is positioned such that the blades of the turbo 214 are turned by the flow of high velocity fluid 20 coming from one-way PV valve 202. As this fluid 20 flow turns the turbo 214, the shaft of the turbo 214 turns. The shaft of the turbo 214 is used to create work such as, but not limited to, turning an alternator 218, running a generator 216, powering a battery charger or running a hydraulic pump or other similar devices. As shown in FIG. 2, the battery charger can be used to charge a battery 220.

As the fluid 20 flows into and through the expansion cycle subsystem 210, the fluid 20 is decompressed to the point that it is much colder than when it entered the expansion cycle subsystem 210. This decompressed, and colder, fluid 20 from the expansion cycle subsystem 210 is passed through a condenser cycle subsystem 250 that transfers the thermal energy to and from the surrounding environment. The cold mixture of fluid 20 is routed through the conduits 10 or radiant coolers 254 in the condenser cycle subsystem 250. A fan 260 can circulate the warm air in the enclosed space across conduits 10 or radiant coolers 254 that carry the cold fluid 20 in a mixed liquid and vapor state. This condenser cycle subsystem 250 functions much like an air conditioner and can cool and area such as the inside of a car. This cooling can also be directed to other elements of an automobile such as the engine itself or the air intake of the engine.

Where the fluid 20 comprises helium, the fluid 20 enters the expansion cycle subsystem 210 as a pressurized vapor and stays in a vapor state throughout this subsystem and the condenser cycle subsystem 250. As the fluid 20 absorbs heat from the environment, in exchange for the cold of the fluid 20, the fluid 20 warms.

Once through the condenser cycle subsystem 250, the fluid 20 flows to the reservoir subsystem 300. By allowing ample flow of cooling air around the reservoir 306, the fluid 20 is returned to a temperature relatively lower than the fluid 20 coming directly from exposure to the heat source 102. This will form a low pressure or vacuum on the inside of the reservoir subsystem 300 and induce a flow of fluid 20 throughout the system and through one-way PV valve 302. PV valve 302 allows fluid 20 to enter into the reservoir subsystem 300 and maintain the pressure difference between that subsystem and the condenser cycle subsystem 250. Valve 302, and its function, may also be performed by the compressor 304. The reservoir subsystem 300 also pressurizes the fluid 20 with the use of a compressor 304 ensuring the fluid 20 is in its proper state for introduction into the energy capture subsystem 100.

In one embodiment, a pump 310 maintains the pressure in the reservoir subsystem 300 so that the fluid 20 is maintained at a pressure to induce the fluid 20 into PV valve 308.

As the fluid 20 flows back into the energy capture subsystem 100 and past the heat source 102, it is heated again and the cycle continues.

Although the above embodiment was illustrated utilizing helium as the fluid 20, it is also possible to utilize other embodiments of a fluid 20. Water would also be a suitable fluid 20 for use with this energy retriever system 1000. As mentioned above, this embodiment would create a system with different states for the fluid 20 than the embodiment utilizing helium. For example, when using water as the fluid 20 while the system is operating, the fluid would normally be in a liquid state in both the reservoir subsystem 300 and the energy capture subsystem 100 while the fluid 20 would be in a generally vapor state through the energy extraction subsystem 200.

As shown in FIG. 2, the result of this operation is the turning of the turbo 214 can be used to create work such as turning a shaft. This work from the shaft would in turn be used to power any number of devices such as a generator 216 to supply the electrical power to the rest of the car as well as an alternator 218 to recharge a battery 220. This work could also be used to provide supplementary mechanical work to help turn the wheels of a vehicle.

In addition to the work benefits from the turbo 214, the thermal energy from the expansion cycle subsystem can be used to cool an area such as an automobile interior or a refrigeration trailer. In this embodiment, the temperature of the fluid 20 in the condenser cycle subsystem will typically be less than the temperature of automobiles interior. By blowing air over the first radiant cooler 254 with a fan 260, the relatively cool temperature of the fluid 20 cools the surrounding environment. This system can even be used to provide the cooling for other environments such as is necessary to maintain a refrigerated container towed by a commercial truck. This cool fluid 20 can also be used to cool the engine or engine air intakes.

As shown in FIG. 2, a bypass valve 30 and conduit 10 can be installed between the energy capture subsystem 100 and one or more radiant coolers. The bypass valve 30 allows the fluid 20 to continue to flow without flowing though the turbo 214 but through the first radiant cooler 254 to cool the fluid. This valve 30 can also act as a temperature regulator for the purpose of maintaining a desired temperature in any given space.

In addition to providing additional work and thermal benefits, the absorption of heat from the ICE helps reduce the ICEs operating temperature. In the event that the reduced demand on the engine cools the engine too much, the cooling system can be set to force the engine to operate at a higher temperature.

Figure 4:
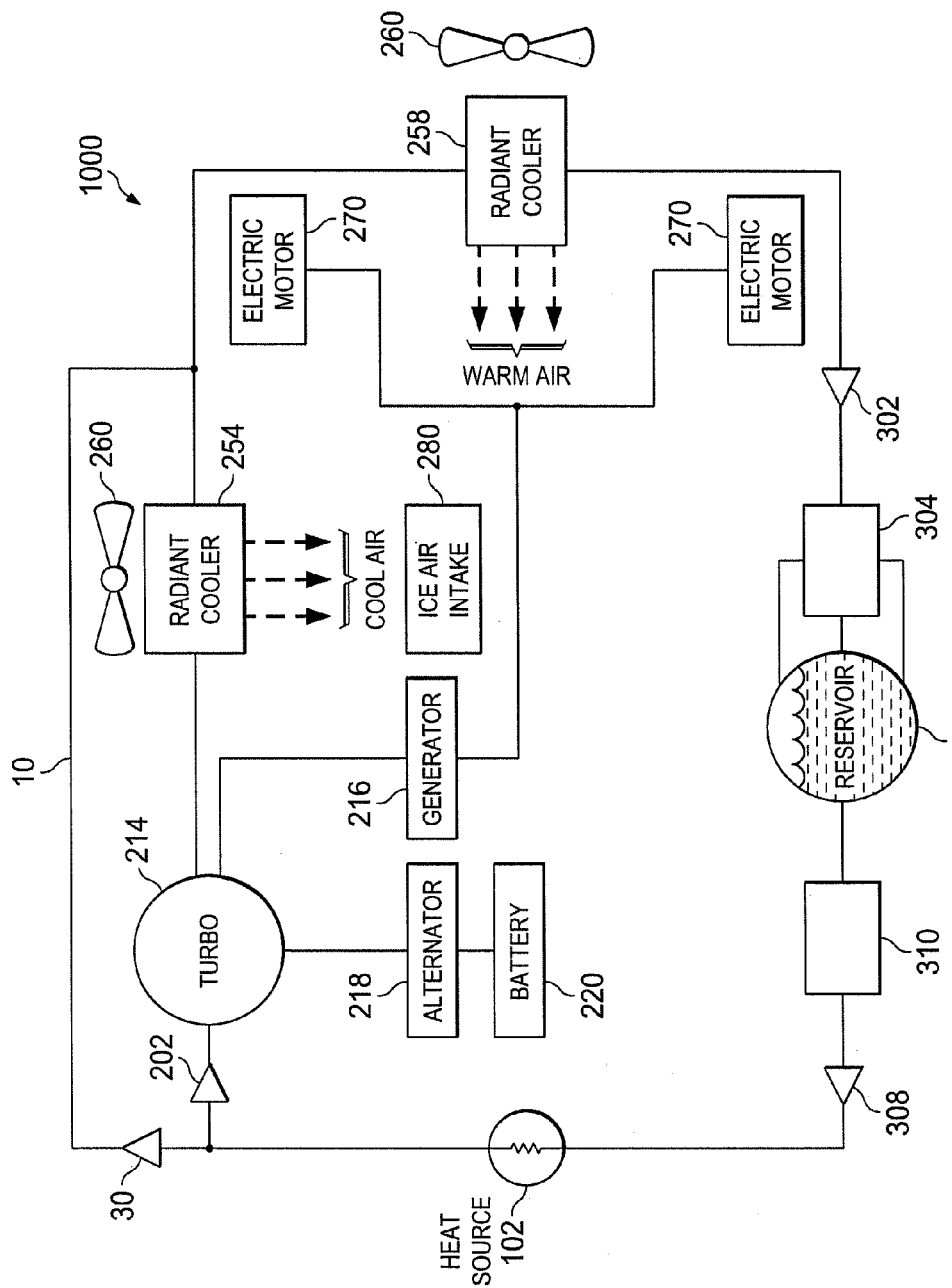
FIG. 4 shows another embodiment of the energy retriever system illustrating another embodiment of the energy extraction subsystem.

Another Embodiment of the Energy Extraction Subsystem—Cool Air Intake:

In another embodiment of the invention shown in FIG. 4, the energy extraction subsystem can be used to cool air before it is feed into the air intake 280 of an ICE. In this embodiment, the radiant cooler 254 used to provide air conditioning or refrigeration can be used to cool the intake air 280 for the automobile ICE. The cooler the air "breathed" by an engine the better the ICE will run, the better the compression, the more power will be produced and the cooler the ICE will run.

In this embodiment, the radiant cooler 254 can be used to cool the air just before it enters the ICE to enhance the compression and provide greater compression. By feeding the ICE cool air the power will be greatly enhanced. In addition the level of humidity of the air can be increased during this stage as well. This will help to lower the temperature of the air and further increase the compression inside the combustion chamber of the ICE. By reducing the size of the air intake 280 and the amount of fuel provided the power production will return to normal but and fuel consumption will be reduced.

ICE's designed to operate with this system may need to be designed to operate at considerably higher temperatures than today's normal ICE's. This way the engine will achieve its full operating temperature sooner and the system will be fully operational sooner as well. By using the cool compressed air created by the system the temperatures in the combustion chambers of the ICE can be kept at normal temperatures and thus will minimize pollution.

Multiple radiant coolers can also be used to have the first radiant cooler 254 enhance the cooling of the fluid 20 by blowing the cool air of radiant cooler 254 over the second radiant cooler 258.

Another Embodiment of the Energy Extraction Subsystem—Battery Charger:

In another embodiment of the invention, as shown in FIG. 4, the energy extraction subsystem can be used to recharge one or more batteries 220 of a gasoline or electric hybrid car or operate any number of devices or equipment in that car.

This type of embodiment is helpful in providing the benefit of being able to use the energy generated from the energy retriever system at a time when the heat source is not actively producing sufficient heat. This situation exists in an automobile when the engine is not running where the charged batteries may power an electric motor to propel the vehicle. This type of embodiment is particularly helpful when integrated into a vehicle that is able to be propelled by an electric motor and the ICE can be turned off when not needed. The electricity that the thermal cycle generated runs the vehicle. In an implementation with a refrigeration truck, the energy retriever system can be used to charge batteries that can be used to continue to run compressors or heaters that will continue the thermodynamic cycle so that a refrigeration compartment can be kept cold even when the truck engine is turned off. The same benefits are gained from a fishing vessel that needs to refrigerate a compartment when the ship engine is not operating. Similar benefits are gained from implementations that use solar energy where batteries can be charged while the sun is out and battery power can be used when solar heat is not available.

Other Embodiments of Energy Extraction Subsystem—Electrical Motor:

FIG. 4 also shows another embodiment of the energy retriever system where the work generated by the energy retriever system 1000 can include power generators 216 and alternators 218 which can be used to power electrical motors 270. These electrical motors 270 can be used to power other systems or to act as auxiliary propulsion for the ICE. For example, placing electrical motors 270 on the front axle of a rear wheel driven vehicle, and using them to turn the wheels, reduces some of the work needed to propel the vehicle. Power for these electrical motors 270 will come from the generators 216 and alternators 218 run by the turbos in the expansion cycle subsystem. This reduces the demands on the ICE and drops the amount of fuel needed to operate the engine. Where necessary, clutch and other drive components may need to be used to connect the electrical motors 270 to the vehicle drive mechanisms.

Figure 8:
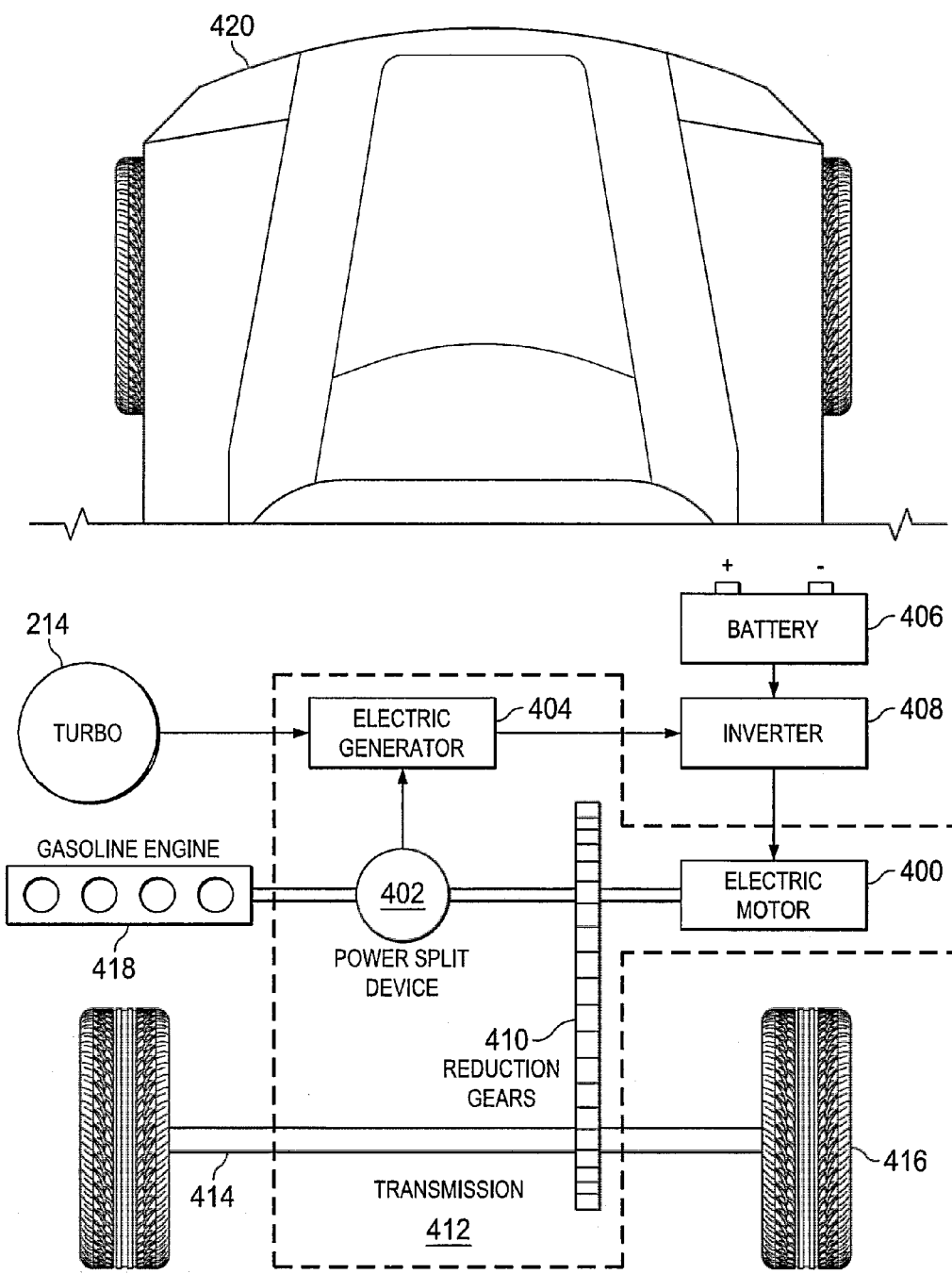
FIG. 8 shows a single diagram of a conventional electric motor mounted on a vehicle.

Another embodiment uses two separate turbos and generators each driven independently and mounted in the wheel wells for maximum effect. These would supply their maximum power to the wheels before the standard ICE would begin to propel the car. The system could also use a single turbo (214 in FIG. 8) and generator to power a single auxiliary electrical motor routed through a power splitting gear. FIG. 8 is a simplified diagram of such a system using an electrical motor 400 mounted on a vehicle (illustrated in simplified fashion as 420 in FIG. 8), the vehicle having front and rear axles (front axle 414 shown in FIG. 8) and wheels 416. The power splitting gear 402 acts through the electric generator 404 with its associated inverter 408 and battery 406 to supply power to the electric motor 400. The power splitter is also connected mechanically to the output of the vehicle internal combustion engine 418, whereby the output shaft of the vehicle engine and output shaft of the electric motor act through the reduction gears 410 of a conventional transmission 412 to propel the vehicle. The turbo 214 provides supplemental power to the electric generator 404 In this manner both the ICE and the electrical motor are driving the vehicle at the same time. With the additional power from the electrical motor, the load on the ICE will be lessened and the fuel consumption reduced. As the engine bums less fuel the cooling system will reduce its function as well to maintain the exhaust temperature and thus continue the thermal process.

Figure 5:
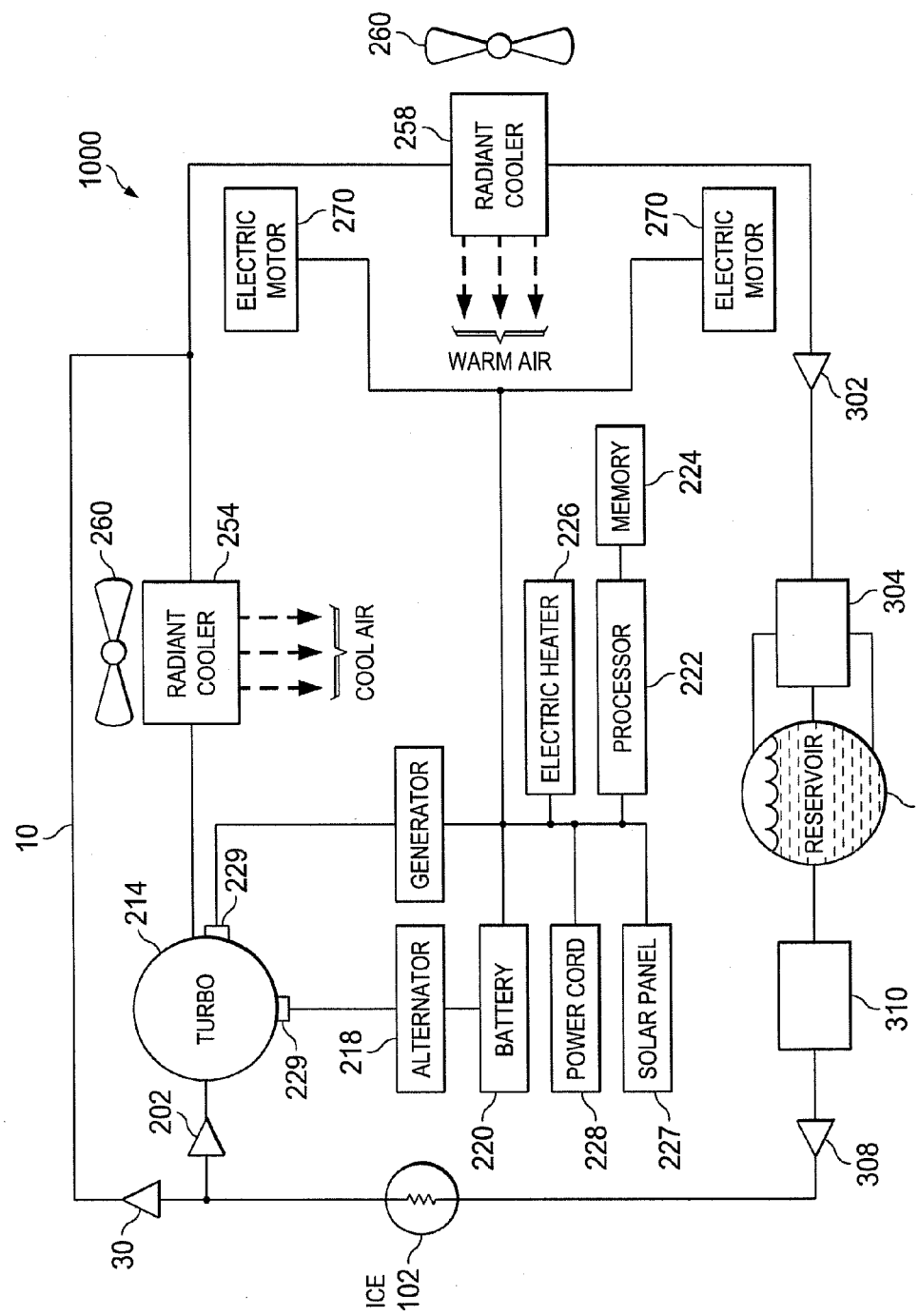
FIG. 5 shows another embodiment of the energy retriever system.

Another Embodiment of the Energy Extraction Subsystem—Heat Fuel:

As shown in FIG. 5, in another embodiment of the invention, the heat from the ICE's operation can be used to pre-heat the fuel before it is injected in to the combustion chamber.

Another Embodiment of the Energy Extraction Subsystem—Electrical Heating Elements FIG. 5 shows another embodiment of the invention where power from the battery 220 or the generator 216 can be used to power an electric heater 226. The electric heater 226 can be used to provide heat to a space such as an automobile's passenger compartment when the heat source 102, such as an ICE, is not operating or it can be used to take the demand off of the heat source 102 and other heaters while the ICE is running.

Another Embodiment of the Energy Capture Subsystem—Solar Panels:

FIG. 5 shows another embodiment of the invention where solar panels 227 can be used to enhance the energy capture subsystem 210. These solar panels 227 can be used to independently power devices or they can be used to charge the batteries 220. Power from the solar panels 227 would be supplied through a transformer and then into the batteries 220. The solar panels 227 in this embodiment would be in operation whenever the vehicle is exposed to sunlight or bright lights.

Other Embodiments of the Energy Retriever System:

Another embodiment of the energy retriever system 1000 comprises utilizing various combinations of the above elements. One example of this embodiment is shown in FIG. 5 where the energy retriever system 1000 is used in an automobile with multiple methods used to extract energy and work from the system. In this embodiment, the energy retriever system 1000 uses heat from the automobile's engine as the heat source 102 The energy extraction subsystems can be used to cool elements of the car as shown with the radiant cooler 254, to power generators 216 and electric motors 270 to help propel the car and to turn an alternator 218 that charges one or more batteries 220. The energy retriever system can also be used to power hydraulic pumps that can either be used to help propel a vehicle or power other devices.

With an embodiment of the energy retriever system incorporated into an automotive vehicle, as is shown in FIG. 5, a dynamic system can be created between this embodiment of the invention and the normal automobile's ICE. For example, on longer drives in an automobile, the ICE would be used initially to provide most of the propulsion duties of the car while the energy retriever system 1000 takes the heat resulting from the internal combustion and recharges the batteries 220 and provides some propulsion of the vehicle as well. Since the electrical power provided by the energy retriever system 1000 is more than the electrical system will be using, the batteries 220 will be charged to full capacity at a certain point in the drive. When this happens the ICE can automatically shut down and the electrical system takes over the propulsion duties of the vehicle until they again drop below a threshold capacity. At this threshold, the ICE restarts and the cycle starts again.

As shown in FIG. 5, another embodiment of the energy retriever system includes a power cord 228 that can be used to plug into a normal electrical outlet and charge the batteries 220.

As shown in FIG. 5, another embodiment of the energy retriever system includes a computer system with logic stored and exercised by a processor 222 and memory 224 interconnected with system components and sensors to help control and adjust components such as valve thresholds, fan speed, temperatures and other system variables.

The system can be applied and used in any system that generates heat or can create energy to be turned into heat. Boats, trains, trucks, buses, streetcars and other engine driven systems are examples of, but not the only examples of good applications.

Figure 3:
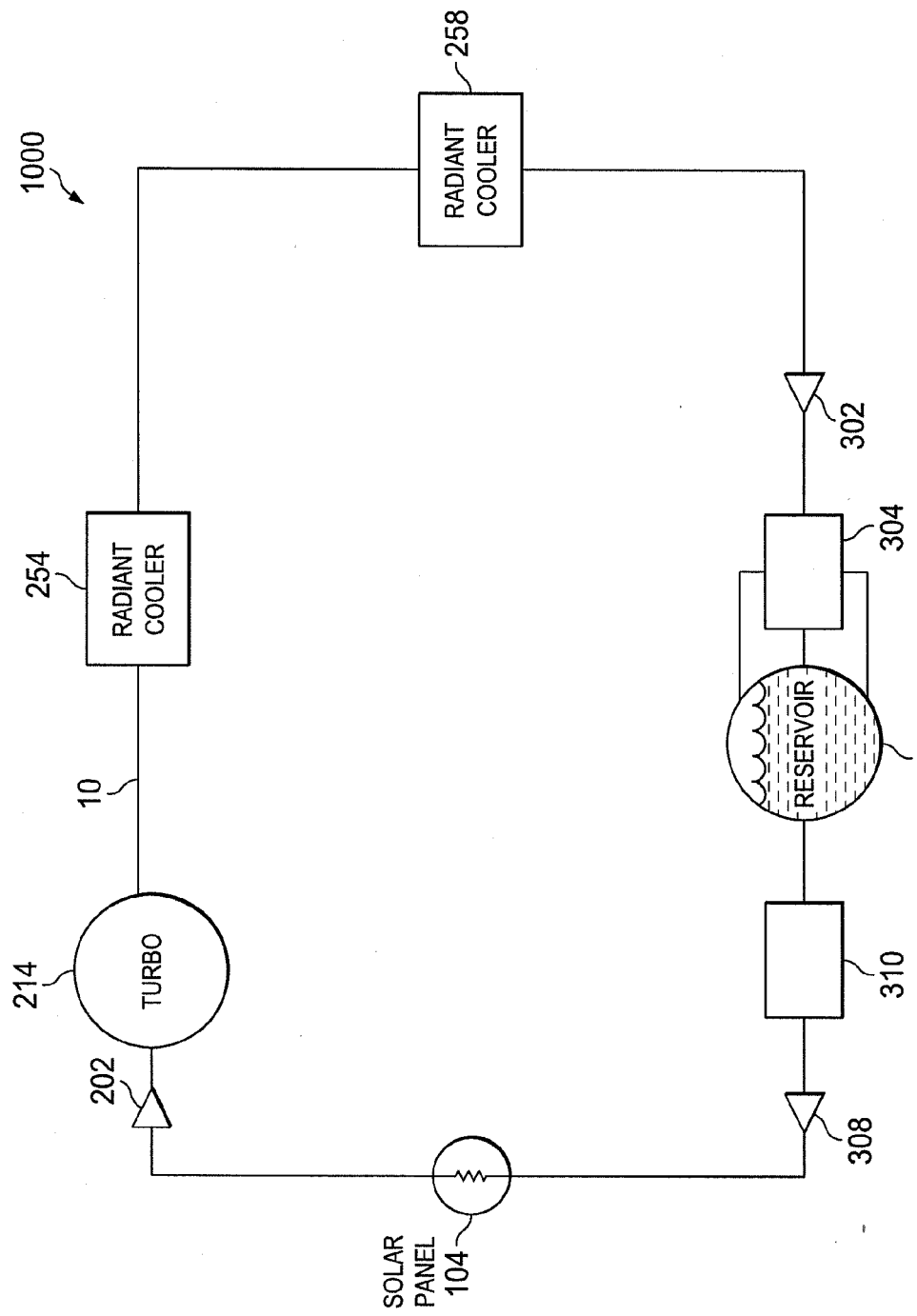
FIG. 3 shows another embodiment of the energy retriever system illustrating an embodiment of the energy capture subsystem.

As shown in FIG. 3, another embodiment of the energy retriever system comprises using the system in buildings or other habitable structures by utilizing solar panels 104 as the heat source in the energy capture subsystem 100. For example, a building uses energy and is exposed to thermal energy coming from exposure to the sun. Usually, this heat is a nuisance that actually creates a need for more air conditioning when the temperatures are high. By absorbing some of this thermal energy, the external thermal heat on the building can be used to cool the interior of the building through the use of the condenser cycle subsystem. The thermal energy can also be used to power electrical generators and other useful devices within the building.

Operation of One Embodiment of the Energy Retriever System:

Another example of an embodiment of this system comprising installing this system in a mid-sized economy car. This embodiment comprises an energy retriever system with a heat source that includes solar panels as well as the car's engine. This embodiment also includes batteries and electric motors to help propel the car even when the ICE is not running.

Operationally, with this embodiment, the car could be plugged into a typical power outlet when parked overnight at the owner's home to ensure the batteries are charged. The first thing in the morning the owner comes into the garage and unplugs the car. The charge of the batteries could give the car a 60-minute (city) or 60 mile (highway) range which will cover most common commutes. When the owner gets into the car and presses the "on" button and the electric motor propels the car. At this point, the gas powered I.C.E. has not yet started. Using only the electrical system the cars pulls away and travels the distance to work. The owner parks the car in the lot at work. Assuming this is a sunny day the car will sit exposed to the sun all day while the owner is inside working. During this time the solar cells on the car are helping to recharge the batteries. By lunch the batteries are completely recharged and the owner takes the car for a 5 to 10 miles drive for lunch and returns to the parking lot at work around. The car again sits exposed to the sun's rays and recharges the batteries. At the end of the normal day, the owner gets back in the car and drives it home again silently. During the entire day's drive the ICE has not been used and the owner of the car has not burned any fossil fuel.

On longer drives the ICE would start itself when the battery power is not sufficient. At this point, the ICE would take over most of the propulsion duties of the car while the heat resulting from the internal combustion recharges the batteries and provides some propulsion of the vehicle. Since the electrical power provided by the thermal generator is more than the electrical system will be using, the batteries will reach full capacity. When this happens the ICE automatically shut down and the electrical system takes over the propulsion duties of the vehicle until they again drop below a threshold capacity. At this point the ICE restarts itself and the cycle starts again.

ICE's designed to operate with this system could be designed to operate at considerably higher temperatures than today's normal ICE's. This way the engine will achieve its full operating temperature quicker and the energy retriever system will be fully operational quicker as well. By using the cold compressed air created by the system the temperatures in the combustion chambers of the ICE can be kept at normal temperatures and thus will reduce pollution from the ICE.

While these are some of the applications of this system, they are in no way intended to be taken as all inclusive and it is understood that there are many other applications not mentioned and as well as those yet to be determined. Where there is enough heat to require that a cooling system be installed, there usually be enough heat to operate this cooling system at a considerable less cost than a conventional system.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

What is claimed is:

1. A self-contained thermodynamic energy retrieval system, the energy retrieval system comprising:
    a conduit in proximity to a heat source of the internal combustion engine such that heat from the heat source is transferrable to the conduit;
    a turbo fluidly coupled to the conduit;
    a condenser cycle subsystem fluidly coupled to the conduit;
    wherein the turbo is adapted to turn in response to a flowing fluid heated by the transferred heat, thereby converting kinetic energy of the heated flowing fluid to mechanical energy;
    wherein the condenser cycle subsystem is adapted to cool the flowing fluid for recycling back to the heat source; and
    wherein the heat sources comprises an exhaust manifold, and the conduit is in proximity to the exhaust manifold, whereby, when the engine is running, hot exhaust gases pass through the exhaust manifold, creating exhaust heat, such that exhaust heat from the exhaust manifold is transferrable to the conduit.

2. The system of claim 1 further comprising an electric generator coupled to the turbo, an electric motor coupled to the electric generator, and an output shaft coupled to the electric motor to transfer the mechanical energy to the output shaft.

3. The system of claim 2 wherein the output shaft is coupled to the output shaft of the internal combustion engine such that the mechanical energy is transferred to the internal combustion engine output shaft.

4. An energy retrieval system for an internal combustion engine of a vehicle, the vehicle having an exhaust manifold which releases a source of waste heat, the energy retrieval system comprising:
    an energy capture subsystem located in proximity to the source of waste heat at an operation temperature, the energy capture subsystem having at least one conduit containing a fluid at a pressure;
    said fluid having a high expansion factor, high thermal conductivity and a boiling point lower than said operational temperature of said heat source and lower than said fluid at said heat source;
    an expansion cycle subsystem;
    a condenser cycle subsystem;
    a reservoir subsystem;
    a plurality of conduits connecting said energy capture subsystem, said expansion cycle subsystem, said condenser cycle subsystem and said reservoir subsystem;
    said plurality of conduits containing said fluid;
    said expansion cycle subsystem comprises at least one conduit and a valve and at least one turbo;
    said condenser cycle subsystem comprises at least one conduit and at least one radiant cooler;
    said reservoir subsystem comprises at least one conduit, at least one valve, a reservoir and at least a selected one of a compressor and a pump;
    an electric generator interoperably connected to the turbo, the generator, in turn, being interoperably connected to an electric motor, the electric motor having an output shaft connected to a power splitting gear, the power splitting gear also being connected to an output shaft of the internal combustion engine of the vehicle, the power splitting gear acting through a conventional gear and transmission system to turn an axle of the vehicle, whereby when the internal combustion engine and the electrical motor are both running, they act through the power splitting gear to simultaneously turn the gear and thereby simultaneously propel the vehicle.

* * * * *

UNITED STATES PATENT AND TRADEMARK OFFICE
CERTIFICATE OF CORRECTION

Page 1 of 1

PATENT NO.         : 8,966,898 B2
APPLICATION NO.    : 13/966773
DATED              : March 3, 2015
INVENTOR(S)        : Paul W. Corley It is certified that error appears in the above-identified patent and that said Letters Patent is hereby corrected as shown below:

In the claims

Column 17, line 22, claim 14, the phrase which reads

"a conduit in proximity to a heat source of the internal combustion engine"

Should read

"a conduit in proximity to a heat source of an internal combustion engine"

Signed and Sealed this
Nineteenth Day of April, 2016

Michelle K. Lee
*Director of the United States Patent and Trademark Office*